Patented Dec. 19, 1950

2,534,774

UNITED STATES PATENT OFFICE 2,534,774

PIPERAZINE DERIVATIVES

Robert Michel Jacob, Ablon-sur-Seine, and Jacques Robert, Paris, France, assignors to Societe des Usines Chimiques Rhone Poulenc, Paris, France, a French body corporate No Drawing. Application January 6, 1950, Serial No. 137,289. In France January 24, 1949

4 Claims. (Cl. 260—268)

This invention relates to new piperazine derivatives and particularly to a class of piperazine derivatives which have been found to have therapeutic value.

According to the present invention new piperazine derivatives of therapeutic value conform to the general formula:

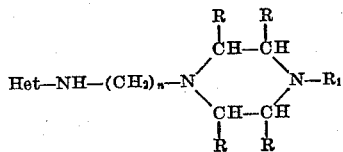

where the several R's are the same and each is a hydrogen atom or a methyl group, R₁ is a methyl group or an ethyl group, n is 2 or 3 and Het is a 7-chloroquinolyl-4- or 2-chloro-7-methoxyacridyl-5-group.

According further to the present invention, the aforesaid compounds are produced by condensing 4:7-dichloroquinoline or 2:5-dichloro-7-methoxy-acridine with an amine of the formula:

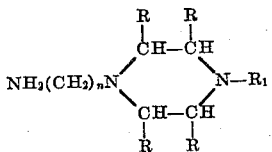

The amines may themselves be obtained by reduction of the corresponding nitriles.

The compounds produced according to the present invention have therapeutic properties of value both in human and veterinary medicine and they are especially valuable by reason of their strong antimalarial activity.

The following examples will serve to illustrate the invention but are not to be regarded as limiting it in any way

Example I 24.5 g. of 1-ethyl-4-(2'-amino-1'-ethyl) piperazine are added drop by drop to a solution of 29.5 g. of 4:7-dichloroquinoline in 118 g. of phenol maintained at a temperature of about 100° C. When the addition has been completed, the mixture is heated at boiling point for 4 hours. The mixture is allowed to cool and is then poured into an excess of 10% caustic soda solution. This mixture is then cooled with ice, and the product, which crystallises out, is centrifuged. 45 g. of 4-[(7''-chloro-4''-quinolyl)-2'-amino-1'-ethyl]-1-ethyl piperazine of the formula:

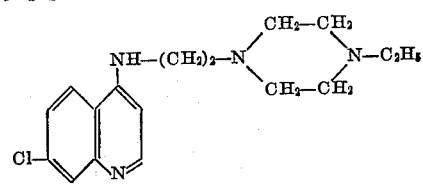

are thus obtained, m. pt. 134–135° C. (capillary test) after recrystallisation from acetone.

The initial 1-ethyl-4-(2'-amino-1'-ethyl) piperazine may be obtained in the following manner:

25.2 g. of chloracetonitrile are added drop by drop to a solution of 76. g. of 1-ethyl piperazine in 50 cc. of alcohol, the mixture being cooled with ice. The ice bath is withdrawn and the mixture is heated under reflux on a boiling water bath for 1 hour. The alcohol is distilled off under a pressure of 80 mm. of mercury by heating on a water bath. The residue is taken up in 130 cc. of 30% caustic soda solution, the liquid being cooled with ice during the mixing, and the mixture is extracted with ether. The ethereal extracts are dried over caustic soda in pellet form and the ether is then driven off on the water bath. On rectification of the residue, 32.6 g. of 1-ethyl piperazine are recovered and 44.1 g. of 1-ethyl-4-cyanomethyl piperazine are obtained, b. pt. 130–131° C./23 mm. of mercury.

An autoclave is charged with 41 g. of 1-ethyl-4-cyanomethyl piperazine as thus prepared, 8.2 g. of Raney nickel, 2 cc. of 30% caustic soda solution and 250 cc. of methanol. The mixture is agitated for 9 hours under a pressure of 40–50 atmospheres of hydrogen. It is then filtered, the methanol is driven off at normal pressure and the residue is rectified. 25 g. of 1-ethyl-4-(2'-amino-1'-ethyl) piperazine are thus obtained, b. pt. 116–117° C./27 mm. of mercury.

Example II

To a solution of 31.3 g. of 4:7-dichloro quinoline in 126 g. of phenol maintained at a temperature of about 100° C. are added drop by drop 28.5 g. of 1-ethyl-4-(3'-amino-1'-propyl) piperazine. When the addition is complete, the mixture is then allowed to cool and taken up in an excess of 10% caustic soda solution. A little benzene is added and the product crystallises. After centrifuging, the product is washed with water until it is neutral to phenolphthalein. It is then dried in a vacuum desiccator over sulphuric acid and 49 g.

of crude 1-ethyl-4-[(7''-chloro-4''-quinolyl)-3'-amino-1'-propyl] piperazine of the formula:

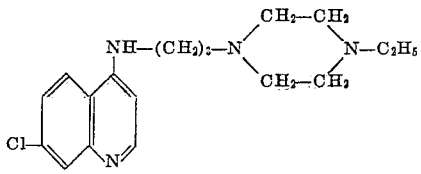

are thus obtained, the melting point of which, after recrystallisation from acetone, is 131–132° C. (capillary test).

The initial 1-ethyl-4 - (3' - amino - 1'-propyl) piperazine is obtained in the following manner:

To 42 g. of 1-ethyl piperazine are added 18.6 g. of acrylonitrile. The mixture is allowed to stand for 12 hours and is then heated for 4 hours at 100–110° C. On rectification, 51 g. of 1-ethyl-4-(2'-cyano-1'-ethyl) piperazine, b. pt. 156–158° C./31 mm. of mercury, are obtained.

An autoclave is charged with a solution of 48 g. of 1-ethyl-4-(2'-cyano-1'-ethyl) piperazine, as thus prepared, in 250 cc. of methanol, 9.6 g. of Raney nickel and 2.5 cc. of 0% caustic soda solution. The mixture is agitated for 17 hours under a pressure of 50 atmospheres of hydrogen. It is then filtered, the methanol is driven off at normal pressure, and the residue is rectified. There are thus obtained 31 g. of 1-ethyl-4-(3'-amino-1'-propyl) piperazine, b. pt. 136–137° C./33 mm. of mercury.

Example III 25 g. of 1-ethyl-4-(3'-amino-1'-propyl) piperazine are added drop by drop to a solution of 39 g. of 2:5-dichloro-7-methoxyacridine in 168 g. of phenol maintained at a temperature of about 100° C. After cooling, the mixture is taken up in an excess of 10% caustic soda solution. It is then extracted with benzene and the benzene solutions are washed with dilute acetic acid. The acetic acid solutions are rendered alkaline with ammonia (22° Bé.). 1-ethyl-4 - [(2'' - chloro - 7''-methoxy - 5'' - acridyl) - 3' - amino - 1'-propyl] piperazine of the formula:

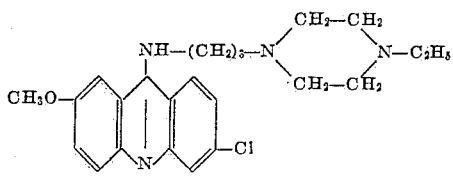

precipitates in the form of an oil which slowly crystallises. The product is centrifuged, washed with water and recrystallised from acetone. 53 g. of a product, m. pt. 92–93°0 C. (capillary test), are thus obtained. The base is converted into a trihydrochloride which crystallises with 2 mols of water, m. pt. 265° C. (instantaneous melting point on the Maquenne block).

Example IV

To a solution of 4.45 g. of 4:7-dichloroquinoline in 25.6 g. of phenol maintained at about 100° C. there is added dropwise 7.2 g. of 1-ethyl-2:3:5:6-tetramethyl-1-4 - (2'-aminoethyl-1') piperazine. After addition is complete the mixture is heated at its boiling point for 4 hours. After it has been allowed to cool, it is poured into an excess of 10% sodium hydroxide solution. The mixture is extracted with ether and the extract is washed with water and dried with anhydrous sodium sulphate; the extract is then evaporated nearly to dryness and the solution crystallises. By filtration, 3.8 g. of 1 - ethyl - 2:3:5:6 - tetramethyl - 4 - [2' - (7''-quinolylamino-4'') - ethyl - 1'] piperazine of the formula:

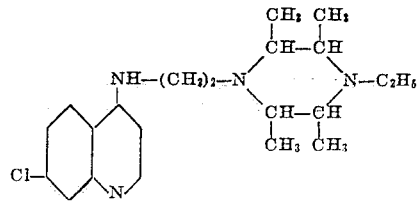

is obtained which, after recrystallisation from acetone, melts at 142–143° C. (capillary test). Its hydrochloride melts at 240–245° C. with decomposition (Maquenne block, instantaneous melting point).

The 1-ethyl-2:3:5:6-tetramethyl-4-(2'-aminoethyl-1')-piperazine (b. pt. 127–131° C./10 mm. of mercury) is prepared by reducing 1 - ethyl-2:3:5:6-tetramethyl - 4 - cyanomethyl piperazine (b. pt. 142°–144.5° C./14 mm. of mercury) which is itself obtained by the action of chloracetonitrile upon 1 - ethyl - 2:3:5:6 - tetramethyl piperazine. This last compound (b. pt. 134–134.5° C./110 mm. of mercury) is prepared by the hydrogenation of 2:3:5:6 - tetramethyl piperazine iodoethylate in water in the presence of platinum. This substance is prepared from 2:3:5:6 - tetramethyl piperazine and ethyl iodide.

Example V

To a solution of 16.4 g. of 4:7-dichloroquinoline in 80 g. of phenol maintained at about 100° C. there is added dropwise with stirring 16.5 g. of 1:2:3:5:6 - pentamethyl - 4 - (2' - aminoethyl-1')-piperazine, b. pt. 135–136° C./17 mm. of mercury, whose preparation is described below.

When the addition is complete, the temperature is raised to 180° C. and maintained at that level for 2 hours. The mixture is then allowed to cool and is poured into an excess of 10% sodium hydroxide solution. A copious yellow precipitate is formed which is extracted with chloroform, the extract washed with water, and dried with anhydrous sodium sulphate. The chloroform is then driven off on a water bath and the residue is crystallised from a mixture of acetone and absolute alcohol to give 25 g. of 1:2:3:5:6-pentamethyl-4-[2' - (7'' - chloroquinolylamino - 4'')-ethyl-1']-piperazine which melts at 190° C. (instantaneous melting point on the Maquenne block). It forms a trihydrochloride monohydrate melting at 295–296° C. (instantaneous melting point on the Maquenne block).

The 1:2:3:5:6 - pentamethyl - 4 - (2' - aminoethyl-1')-piperazine is prepared by the reduction of 1:2:3:5:6-pentamethyl-4-cyanomethyl piperazine, itself obtained by the action of chloroacetonitrile upon 1:2:3:5:6-pentamethyl piperazine prepared according to the method described by Kipping, J. C. S., 1932, 1338.

This 1:2:3:5:6 - pentamethyl - 4 - (2' - aminoethyl-1')-piperazine can exist in several isomeric forms; two of these have been separated at the 1:2:3:5:6 - pentamethyl - 4 - cyanomethyl piperazine stage through their maleates. One of these maleates is solid, melting at 133° C. and the successive intermediates obtained from this maleate are characterized as follows:

1:2:3:5:6 - pentamethyl - 4 - cyanomethyl piperazine b. pt.=129° C./2 mm.; m. pt.=59° C.

1:2:3:5:6 - pentamethyl - 4 - (2'-aminoethyl-1') piperazine b. pt.=135–136° C./17 mm.

Example VI

Proceeding in the same manner as in Example V, but using the second isomer of 1:2:3:5:6-pentamethyl-4 - (2' - aminoethyl-1') piperazine, b. pt. 110–111° C./5 mm. of mercury (prepared from 1:2:3:5:6-pentamethyl-4-cyanopiperazine, b. pt.=40° C./4 mm., of mercury, isolated as the maleate from the mother liquors of the maleate melting at 133° C. and which is obtained as an oil) there is obtained a 1:2:3:5:6-pentamethyl-4-[2'-(7'' - chloroquinolylamino - 4'') - ethyl - 1'] piperazine isomeric with that described in Example V and which melts at 178–179° C. (instantaneous melting point on the Maquenne block). It forms a trihydrochloride dihydrate melting at 276–278° C. (instantaneous melting point on the Maquenne block).

We claim

1. New therapeutic agents of especial value as anti-malarial agents, being piperazine derivatives which conform to the general formula:

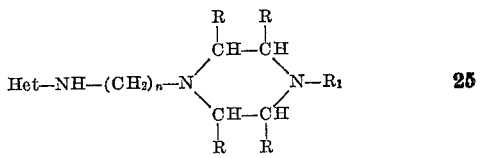

where each R is selected from the class consisting of the hydrogen atom and the methyl group, $R_1$ is selected from the class consisting of methyl and ethyl groups, $n$ is an integer selected from 2 or 3 and Het represents a radical selected from the class consisting of 7-chloroquinolyl-4- and 2-chloro-7-methoxyacridyl-5-.

2. Process for the production of new piperazine derivatives of therapeutic value which conform to the general formula:

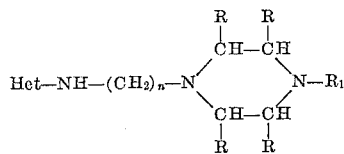

where each R is selected from the class consisting of the hydrogen atom and the methyl group, $R_1$ is selected from the class consisting of methyl and ethyl groups, $n$ is an integer selected from 2 or 3 and Het represents a radical selected from the class consisting of 7-chloroquinolyl-4- and 2-chloro-7-methoxyacridyl-5-, which comprises reacting a compound selected from the group consisting of 4:7-dichloroquinoline and 2:5-dichloro-7-methoxyacridine with an amine of the general formula:

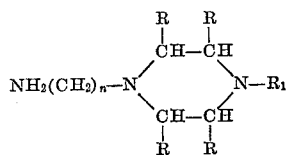

where R, $R_1$ and $n$ have the meanings set forth.

3. The compound 4-[(7''-chloro-4''-quinolyl) - 2'-amino-1'-ethyl] 1-ethyl piperazine.

4. The compound 4-[(7''-chloro-4''-quinolyl) - 3'-amino-1'-propyl] 1-ethyl piperazine.

ROBERT MICHEL JACOB.
JACQUES ROBERT.

No references cited.

Certificate of Correction

Patent No. 2,534,774      December 19, 1950

ROBERT MICHEL JACOB ET AL.

It is hereby certified that error appears in the printed specification of the above numbered patent requiring correction as follows:

Column 3, line 56, for "92–930° C." read *92–93° C.*; line 66, for "tetramethyl-1-4-" read *tetramethyl-4-*; column 5, line 7, for "40° C./4 mm." read *140° C./4 mm.*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*